Patented Feb. 11, 1941

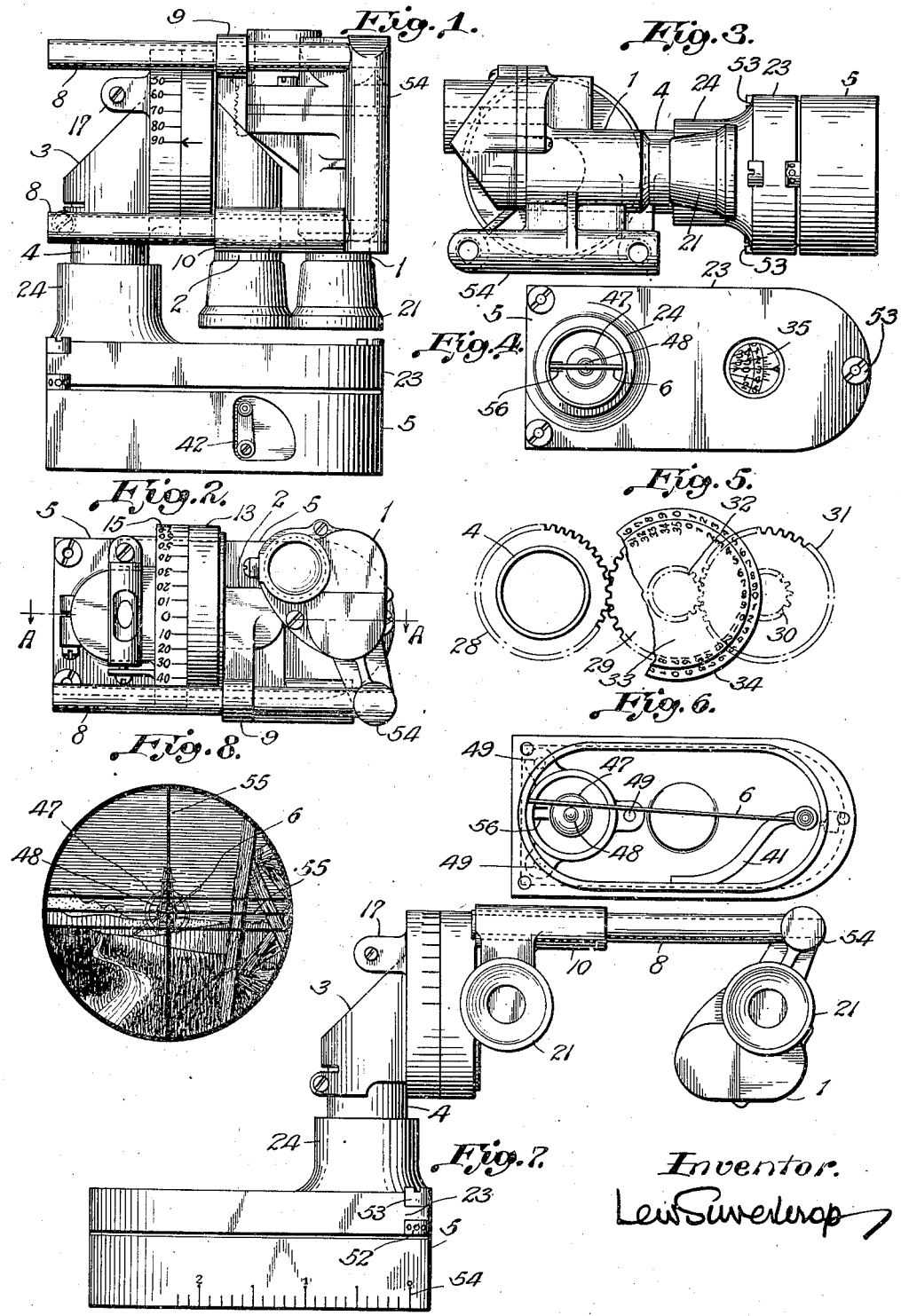

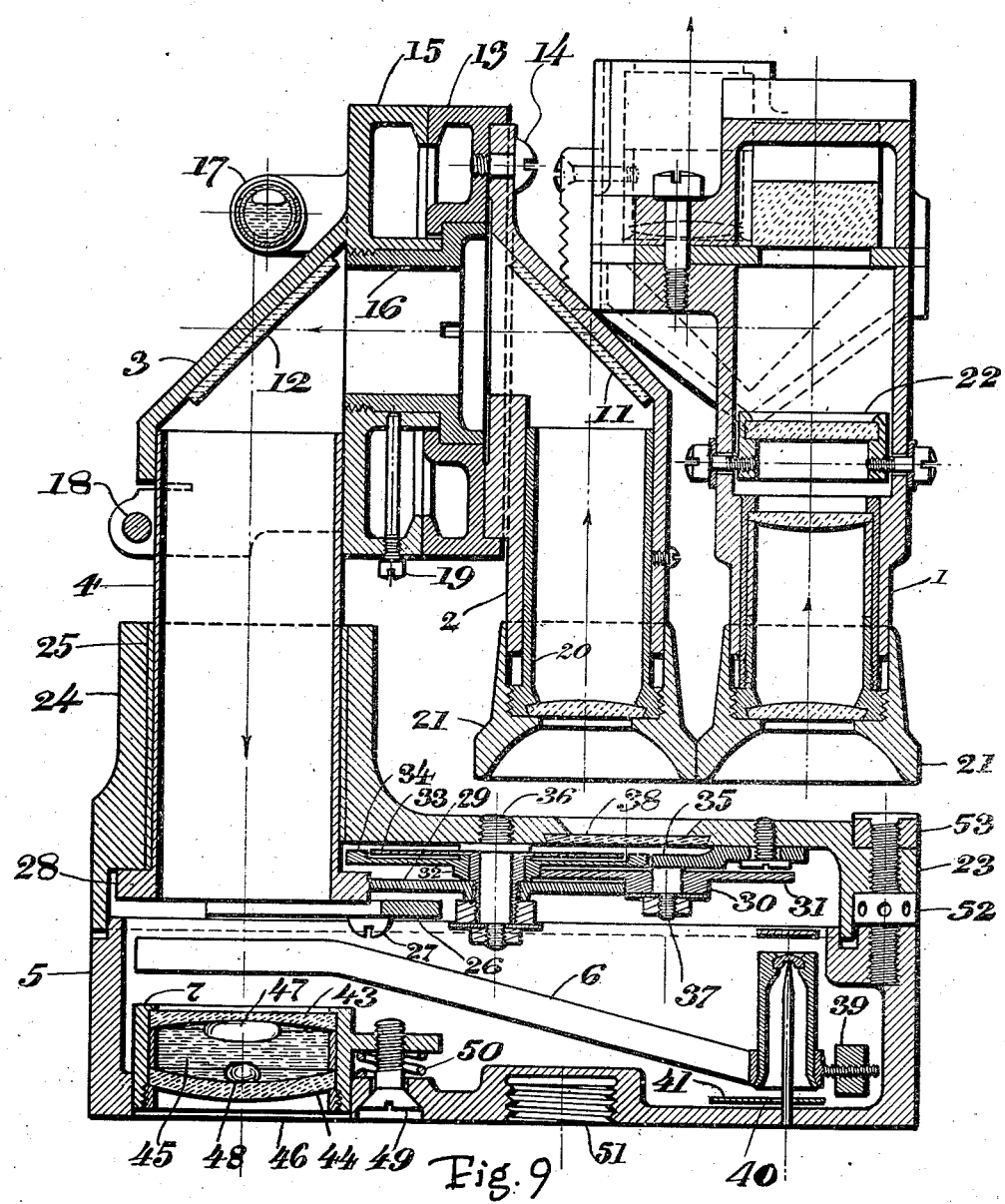

2,231,036

UNITED STATES PATENT OFFICE 2,231,036

SURVEYING INSTRUMENT

Lew Suverkrop, Bakersfield, Calif.

Application June 22, 1936, Serial No. 86,601

8 Claims. (Cl. 88—2.2)

My invention relates to improvements in surveying instruments generally, and more particularly to surveyor's transits, especially the more portable form commonly designated as the pocket transit, such as are carried by geologists in the field. Its functions include determining the magnetic bearing or azimuth of a course, determining the horizontal angle between courses, determining vertical angles, determining dip and strike of rock formations, and the functions of an alidade for use with a plane table.

Surveying instruments generally, in which a compass is included, have comprised a sight fixed to a case in which a compass indicator is free to turn through 360°. In such instruments, means are provided for reading the angle turned by the compass indicator. They are calibrated so that the angle made by the compass indicator is zero, according to a scale fixed to the compass case, when the sight is in any chosen reference direction such as due north. In such instruments, the compass azimuth of a course is the angle turned from zero by the compass indicator resting in the meridian normally sought by it. My present invention involves a new principle. The case is not fixed to the sight, but may be rotated. Means are provided for reading the angle turned by the case with respect to the sight. The instrument is calibrated so that the angle reads zero when the sight is in the chosen reference direction, such as due north, and the rotatable case has been turned so that the compass indicator resting in the meridian normally sought by it coincides with an index on the case. The compass azimuth of a course in this new instrument is therefore the angle turned by the case in order to bring the compass indicator, when the latter is in the meridian it normally seeks, to an index or zero mark on the case, while the relatively rotatable sight is held in the line of sight. The essentials of the new instrument may be divided into three parts: (1) a compass, such as a trough compass, which may be provided with a level; (2) a sight rotatably attached to the compass; and (3) means for measuring rotation of the sight with respect to the compass. These essentials, by virtue of the principle involved, may be included in a design that gives the instrument a valuable combination of versatility, accuracy, and portability. To those familiar with the use of such instruments, objects of the invention will be clear from the following description and the accompanying illustrations, in which Fig. 1 is a side elevation of one form of the instrument when folded;

Fig. 2 is a plan view of the same;

Fig. 3 is an end elevation of the same;

Fig. 4 is a plan view with some of the parts of Fig. 2 removed so as to show a plan of the top of the case;

Fig. 5 is a plan showing the arrangement of some of the parts within the case of the instrument;

Fig. 6 is a plan view showing some of the parts within the case of the instrument;

Fig. 7 is an elevation of the instrument extended for use;

Fig. 8 is a sketch intended to convey the impression given an observer while looking through the instrument; and Fig. 9 is an enlarged cross section through A—A in Fig. 2.

I shall first give a brief summary description of this improved instrument as here illustrated. A sight tube 1 is supported upon a level tube 2 which is free to turn about a horizontal axis in a head 3 mounted on a hollow column 4. This hollow column 4 is supported from a case 5 which is free to turn about the axis of the column 4 which is also the vertical axis of the instrument. Within the case 5 are a magnetic needle 6 and a level 7, upon both of which observation may be made by the eye placed at the level tube. At the same time, the other eye is directed upon the object through the sight tube 1. In this way the observer may at the same instant observe the condition of the level 7, note the position of the needle 6, and sight upon the object. Means are also provided for (a) showing the vertical angle through which the sight tube 1 was elevated or depressed from the horizontal at the instant of observation, and (b) showing the horizontal angle through which the case 5 was turned to bring the needle central with the case 5. Thus, with the instrument in adjustment, one may obtain at a single observation the vertical angle of the line of sight from the instrument, and a horizontal angle or magnetic azimuth. These and other uses and advantages of the instrument will be apparent from the following exposition:

As here illustrated, the sight tube 1 is supported by hollow guide rods 8—8 which slide in the guides 9 and 10. These guides 9 and 10 are integral with the level tube 2. A mirror 11 within the level tube 2 deflects the line of sight from the level tube 2 through the hollow screw 16 into the hollow head 3 where a second mirror 12 again deflects the sight down into the hollow column 4. Thus, regardless of the position of the level tube 2 about the horizontal axis of the head 3, the position of the needle 6 and the condition of the level 7 may be noted by the observer. A flange on the sight tube 2 is provided for attaching it to the retaining ring 13 by means of screws as 14. The retaining ring 13 in turn is held concentric with the vertical circle 15, which is a part of the hollow head 3, by means of the hollow retaining screw 16. The vertical circle 15 is graduated in degrees and the retaining ring 13 may be provided with a vernier or other means may be provided for determining angle about the horizontal axis. A level 17 is provided to assist in adjusting the instrument and to facilitate making certain kinds of observations. The head 3 is slotted and provided with a clamp screw 18 so that the head 3 may be adjusted upon and made fast to the column 4. A screw 19 is provided for maintaining the adjustment of the hollow retaining screw 16. As shown, the level tube 2 is provided with a lens tube 20. Both the sight tube and the level tube are provided with eye pieces, 21—21. As shown, the sight tube includes a reticule 22 having cross- and stadia-hairs, and the lens system of an inverting telescope with prisms to erect the image and shorten the sight tube. The case 5 includes a top 23 having a boss 24 which is bushed with a sleeve 25 in which the hollow column 4 is free to rotate. The top 23 is held fast to the case 5 by means of the adjusting nuts 53 on the studs 52. One side of the case is marked with graduations 54 for use when the instrument is employed as an alidade. A U-shaped retainer 26, held by screws 27, keeps the hollow column 4 in the top of the case 23. The case 5 is fitted with a socket 51 for supporting the instrument on tripod or Jacob's staff. Simple means may be provided, such as a common clamp screw, for holding the column 4 fixed to the case, and for holding the ring 13 fixed to the vertical circle 15.

As shown, a novel device is employed for measuring the angular movement of the column 4, with respect to the case 5, about the vertical axis of the instrument. This is the train of gears shown in Fig. 5 and Fig. 9. The lower end of the vertical column 4 is provided with a gear 28 which meshes with the gear 29. The gear 29 drives a pinion 30 which is fixed to a gear 31. The gear 31 drives a pinion 32 which is free to rotate upon the same axis as that of the gear 29. As shown, the gears 28 and 29 are of equal diameter, and the pinion 32 makes nine revolutions for each single revolution of the gear 29. A disk 33 is fixed to the upward extension of the hub of the gear 29. A second disc 34 is fixed to the pinion 32. As shown in Fig. 5, the disc 33 is divided into 36 parts, and these are numbered from 0 to 35. The disc 34 is divided into 40 parts which are numbered in four sets of 10 each, from 0 to 9. A vernier 35 may be provided to facilitate reading. As shown, the gear 29 is mounted to rotate on the stud 36 and gears 30—31 rotate on the stud 37 which is a part of the vernier 35. Gear 32 rotates on the outside of the hub of gear 29. A glass window 38 is provided in a hole in the top 23 of the case 5. Since the ratio of movement of the two disks is 1:9, rotating the column 4 (and therefore the gear 29 and the disk 33) through an angle of 10 degrees will move pinion 32 (and therefore the disk 34) through an angle of 10×9=90 degrees, or one-fourth of a circle. Then, since the disk 34 is divided into 40 parts or each 90 degrees (one-fourth of a circle) is divided into 10 parts, moving the column 4 through 10 degrees will move the disk 34 through 10 divisions. Therefore, each division on the disk 34 equals a single degree, in the movement of the column 4. This construction does away for the need for a large horizontal circle, and at the same time gives widely spaced degree-divisions.

Instead of using a symmetrical magnetic needle which has heretofore been used in devices such as declinator troughs, I prefer a novel needle which is supported at one end. This gives a needle as effective as ordinarily would be the case in a compass having a diameter nearly twice that of the length of the case 5 of this instrument. A counterpoise 39 is provided to adjust the dip of the needle and a non-magnetic pivot 40 may be used to free the assembly of any irregularities due to lack of magnetic balance in the needle 6 about the pivot 40. The counterpoise 39 may be of lead or other material. A lifter 41 actuated by the usual lever 42 may be provided for lifting the needle jewel from the pivot 40 while carrying the instrument.

As shown, a novel level 7 is used. This level 7 has glasses with different radii of curvature, although the glasses may have the same radius and retain features of this part of the instrument. As shown, the top glass 43, the bottom glass 44, and the fluid 45 are transparent so that light entering at the bottom of the case 5 through the hole 46 is free to pass through the level 7 past the needle 6 so that the latter may be observed, and then by reflection through the mirrors 12 and 11, on through the instrument into the eye of the observer. As shown here, an air bubble 47 rests against the top glass 43, and a globule of mercury 48 or sphere of other material rests against the bottom glass 44. The radii of the glasses being different, each of the moving elements 47 and 48 will have a different movement for the same amount of tilt of the level. Thus in a single small level is obtained a combination of precision and quickness of adjustment. Moreover, the fact that the moving elements 47 and 48 move in opposite directions during tilting of the level greatly facilitates the quick plumbing of the instrument as it more definitely indicates the direction and amount of movement required. Three leveling screws 49—49—49 and springs, as at 50, may be used to retain the adjustment of the level 7 with respect to the flat bottom of the case 5.

To determine magnetic azimuth of a course and vertical or horizontal angles, the instrument may be used extended as shown in Fig. 7. To extend the instrument the sight tube 1 is moved outward from the head 3 so that the distance between the eyepieces 21—21 is suitable with regard to the interpupillary distance of the observer. This interpupillary adjustment may be held by friction of the slides 8—8 in the guides 9 and 10, or by other suitable means. The eyes are placed at the eyepieces 21—21 and the left hand grasps the case 5 while the right hand holds the sight tube 1 and its attached parts much in the manner of holding a pair of field glasses. To determine magnetic azimuth or vertical angles it is not necessary to place the instrument on a tripod, although of course the use of a tripod or other firm support increases accuracy and may be helpful in taking a number of readings from a single point. The sight tube 1 is directed and held so that the cross-hairs fall upon the object. With the sight tube held in this position, the vertical axis of the instrument is plumbed. This is accomplished by (a) swinging only the case 5 with respect to the sight tube 1 about the transverse axis through the head 3 and (b) swinging the entire instrument, as a unit, about the line of sight as an axis; in both cases, the line of sight upon the object is maintained. The instrument having thus been plumbed, the cross-hairs are kept upon the object while the case 5 is rotated (upon the vertical axis of the hollow column 4) to a position which permits the needle to hang freely in the center of the case 5 as indicated by the center of elements of the plumbed level 7 or by other suitable indicating means, such as the index mark 56. As suggested in Fig. 8 the observer will now see, merged in the field of vision of his two eyes, (a) the object, intersected by (b) the cross-hairs 55, all overlain but not obscured by (c) the needle 6 and (d) the movable elements of the level, 47 and 48. The instrument is then removed from the eyes without disturbing the position of the case upon the column 4 or the retaining ring 13 upon the vertical circle 15. If the instrument is in adjustment, the vertical angle and the azimuth of the course may then be read from the instrument. These readings appear, respectively, on the vertical circle 15 and at the window 38. To facilitate holding the sight tube 1 in position about the vertical and horizontal axes against motion with respect to the case 5, any common means may be employed, such as simple clamp screws. In making observations along courses having steep vertical angles it is occasionally necessary to invert the sight tube about the transverse axis through the head 3 of the instrument and hold the case 5 in the right hand and the sight tube 1 in the left hand. Observations may be made in this way as easily and accurately as in the reverse position described, it being only necessary to add 180° to obtain the correct azimuth reading.

In laying off a course having a given magnetic azimuth, or in laying off vertical and horizontal angles, the operation is similar to that of determining angles or magnetic azimuth, except that observation upon the object is made after setting the readings upon the instrument. The instrument is similarly used when employing it as a hand level, or for more precise levelling from a tripod.

The instrument is useful in mine and other types of surveying where high vertical angles must be read because of the overhang of the sight tube 1 from the vertical axis of the column. In fact, observations may be made in a vertical plane all the way from nadir to zenith.

When using the instrument as a plane table alidade, the flat bottom surface of the case 5 rests upon the plane table. The instrument will stand of itself in this position if the sight tube is not extended from the head 3. Another way to accomplish the desired balance is first to remove entirely the sight tube 1 from its support on the level tube 2, turn it 180° about the line of sight, and then mount it on the opposite side of the level tube 2 by re-introducing the rods 8—8 into those ends of the guides 9 and 10 which are opposite to the ends that are adjacent to the sight tube 1 when the instrument is in its folded position. The same process may be followed when it is desired to bring the line of collimation close to the vertical axis of the instrument, as when using it as a transit for turning off angles. The column 4 is clamped fast to the case 5 so that the horizontal axis through the head 3 is at right angles to the side of the case 5. This condition is easily obtained by determining the azimuth indicated at the window 38. The plane table may be leveled approximately by means of the level 7 if the instrument is placed on the board so that the level 7 overhangs the edge of the board. More precise leveling of the board may be accomplished by means of the level 17. Vertical angles may be read as before from the vertical circle 15 and distance may be determined by the stadia hairs. Courses and distances may be platted by using the side of the case 5 as a straight edge together with the scale 54.

There are several methods of using the instrument for determining the dip and strike of rock strata. (a) The quickest of these is to sight along an imaginary line parallel to the dip of the beds of rock. Thus, in a single observation the dip and azimuth of the dip (90° from the strike) are obtained. (b) Another method is to determine the strike of the beds by observing along an imaginary line parallel to the strike and then, holding the instrument at eye level with the vertical axis plumb as indicated by the level 17, turn the sight tube 1 in the plane of the dip of the beds until the sight tube 1 is parallel to the dip. By this method, two observations with the instrument give the dip and the strike. (c) In some geological work, particularly in underground work in mines, it is often desirable to observe a dip and strike upon beds exposed only in a hanging wall above the head of the observer. To do this with this instrument, the vertical circle is first set at 0. The rounded forward end of the support piece 54 and the outer surface of the guide 9 are then placed in contact with the plane upon which observation is to be made. Continuing this contact, the entire instrument is turned as a unit until its vertical axis is plumb. This may be observed by viewing the level 7 from below. The points of contact of the support piece 54 and the guide 9 of the instrument with the plane of the rock then lie in the line of strike of the rock. Still maintaining this contact, the head 3 and attached parts of the instrument are swung upward until the entire upper surface of the support piece 54, and the guides 9 and 10 are all in contact with the plane of the rock. The axis of the sight tube 1 will then lie in the dip of the beds. Holding the sight tube 1 and the guides 9 and 10 in this position, the instrument is now swung about its transverse axis through the head 3 until the vertical axis of the instrument is again plumb. Still observing through the level 7 at the bottom of the instrument, the case 5 is now swung about the vertical axis until the needle is central in the case 5. Then the readings of the instrument will be the dip and the azimuth of the dip (90° from the strike). The observation may be made in the darkness of a mine by holding a lamp so that its light passes into the eyepiece of the level tube 2.

In using the instrument as a level or transit it may be mounted on a tripod or Jacob's staff, making use of the screwhole 51, and its use in these functions will be clear to those skilled in the use of such instruments. Use of the tripod or Jacob's staff is not necessary when using the instrument as a hand-level or Abney level, clinometer, or bubble sextant, in which functions the use of the instrument will be similarly clear. The instrument may also be used as a drift indicator in which function it shows the actual compass azimuth of the line of travel of the instrument or a craft to which it may be attached, instead of a simple indication of drift alone which must be applied to the compass reading of an aircraft in order to determine true direction of flight. When used as a drift indicator, or more properly as an indicator of direction of travel of a craft from which an observation may be made with the instrument, the case 5 may be first leveled and second rotated about the vertical axis until the compass indicator resting in its meridian lies in the center of the case 5. Maintaining the case in this oriented position, the sight tube 1, directed at the ground, may be rotated about the vertical axis until objects on the ground appear to move in a direction parallel to the vertical crosshair 55 of the instrument. With the instrument thus arranged in agreement with these observations, the angle read at the window 35 will give direct the azimuth of the course which the instrument or a craft to which it was attached was traveling at the moment of observation.

In adjusting the instrument the line of collimation of the sight tube 1 is first made perpendicular to the horizontal axis of the instrument. The horizontal level 17 is then adjusted to indicate level sights of the sight tube 1 when the vertical angle reads 0. The level 7 is adjusted so that its axis is perpendicular to the bottom surface of the case 5. The vertical axis of the instrument is then adjusted so that when the vertical angle is 0, both the level 7 and the level 17 indicate level for any position of the head about the vertical axis. The details of these and other adjustments of this instrument will be clear to anyone familiar with the surveyor's transit.

After a single hour's practice with this instrument it was found that magnetic azimuth of a course may be determined repeatedly without readings varying a fraction of a degree, and the observations may be made in only a fraction of the time required with compasses now in common use which give readings varying several degrees. At the same time, this instrument compares in size with many such compasses. The novel means which may be provided in the instrument as described, for registering the horizontal angle, is such that a compass of diameter three times the maximum dimension of this instrument would be required in order to obtain the same spacing of degree divisions here offered. That is to say, one of these instruments with a maximum dimension of 4 inches is as easy to read as a compass having a diameter of 12 inches. In point of accuracy, a similar comparison may be drawn, due to the arrangement of the needle and the fact that it is viewed under a magnifying glass. This design makes the instrument suitable for certain kinds of studies of the earth's magnetism, such as a magnetometer survey. One of the reasons for the increased accuracy of the instrument is that, as shown, the observer is concerned only with the position of the needle while making the observation. Consistent with these features making for accuracy and speed is the novel level by means of which a usable and quick and at the same time sensitive level is provided for the instrument without increasing its bulk. The combination of all these features makes for an instrument that is extremely accurate, versatile, gives readings promptly and conveniently, and whose use is quickly learned—all in unusual combination when the extreme portability of the instrument is considered.

While the embodiment of my invention illustrated in the drawings has been described with considerable particularity, it is to be expressly understood that the invention is not to be restricted thereto, reference being had to the appended claims for a definition of the limits of the invention. The instrument may be provided with another kind of level, or another kind of compass needle or indicator, or another means of reading angles, or one or more of these features may be omitted for certain more limited work than lies within the scope of the instrument as described. Ordinary means may be provided for giving the observer a view of the angles turned without removing his eye or eyes from the instrument. The instrument may be constructed as a monocular instrument in which a single sight tube will provide for sighting with one eye both upon the object and upon the needle and level within the case.

I claim:

1. A surveying instrument comprising a casing, a level within the casing, a vertical hollow tube mounted on the casing for rotation at will and while in use about a vertical axis, a conduit in communication with and extending horizontally from the hollow tube, a sighting device mounted adjacent one end of the conduit to turn about the horizontal axis of said conduit, said sighting device comprising means for viewing an object and means for viewing an image of the level, and means for producing and transmitting through the hollow tube and conduit to an observer at the sighting device an image of said level, whereby an observer may view, through the sighting device, an object and the level.

2. A surveying instrument comprising a casing, a level and a compass indicator within the casing, a vertical hollow tube mounted on the casing for rotation at will and while in use about a vertical axis, a hollow conduit in communication with and extending horizontally from the hollow tube, a level tube in communication with said hollow conduit, and a sight tube mounted adjacent to and parallel with the level tube, said level and sight tubes being mounted as a unit to turn about the horizontal axis of said hollow conduit and means for producing and transmitting through the hollow tube, hollow conduit, and level tube, images of the level and compass indicator to the eye of an observer at the level tube, whereby an observer may view an object through the sight tube and simultaneously view the level and compass indicator in the casing.

3. In a surveying instrument: a support having an index on an axis thereof; a compass indicator pivotally mounted on the said axis of the support with one portion thereof capable of swinging across said axis and adapted to be aligned with said index; a device rotatably carried by said support, said device being freely rotatable while making an observation and including instrumentalities for simultaneously sighting an object along a line of sight and for viewing said compass indicator; and means responsive to rotation of said support with respect to said device for indicating the angular relationship between said axis and said line of sight, whereby: a person viewing an object along said line of sight may first rotate said support with respect to said device until the index mark on said support coincides with the compass indicator when the latter lies in the meridian normally sought by it, so that said axis will lie in said meridian; and second, determine the angle between said line of sight and said axis lying in said meridian.

4. An instrument of the class described including a sighting tube mounted upon a level tube with its axis parallel to the axis of the said level tube, said level tube and sighting tube being each so arranged that an observer may view into the said level tube with one eye at the same time as he views through the sighting tube with the other eye; said level tube and sighting tube mounted rotatably upon a hollow head so that said level tube and sighting tube may turn about a horizontal axis at right angles to the axis of the sighting tube; means for indicating the amount of angular movement of said level tube about said hollow head; a hollow column extending from and fixed to said hollow head, with its axis at right angles to said horizontal axis; a case attached to and free to rotate about the axis of the said hollow column; means for indicating the amount of angular movement of said case about said hollow column; a level and a compass indicator within said case; and means for projecting a view of said level and compass indicator through said hollow column, hollow head, and level tube, so that said view may be seen with the eye of the observer placed at said level tube, at the same time as he sees with his other eye the object sighted upon through the sighting tube.

5. A surveying instrument including a support of generally oblong shape, a compass indicator within said support having its extent of angular movement restricted within the sides thereof, means rotatably carried by said support including instrumentalities adapted for simultaneously sighting an object and for viewing said compass indicator, means for indicating the angular relationship between the axis of said sighting instrumentality and the position of said compass indicator, and means for positively moving said indicating means through relative movement between said support and first-mentioned means, said support being movable to an extent permitting said compass indicator to assume its normal directional position free from restraint within the sides of the support, whereby said indicating means will show the degree of angularity between said sighting instrumentality and said compass indicator.

6. A surveying instrument including a support, a compass indicator carried by said support, means for restricting the extent of angular movement of said compass indicator, means rotatably carried by said support including instrumentalities adapted for simultaneously sighting an object and for viewing said compass indicator, means for indicating the angular relationship between the axis of said sighting instrumentality and the position of said compass indicator, means between said indicating means and first-mentioned means operable by relative movement between said support and said second-mentioned means, said support being movable to an extent permitting said compass indicator to assume its normal directional position free from restraint by said restricting means, whereby said indicating means will show the degree of angularity between said sighting instrumentality and said compass indicator.

7. A surveying instrument including a supporting case, a compass indicator within said case, instrumentalities for sighting an object and for viewing said compass indicator, means mounting said instrumentalities on said case for relative rotation with respect thereto about a vertical axis, means for indicating the angular relationship between the axis of said sighting instrumentality and the normal directional position of said compass indicator, a gear fixed to said mounting means, and gearing carried by said case and operatively connected with said gear and said indicating means, said case being movable to a position in which said compass indicator assumes its normal directional position with respect to said case, whereby to rotate said gearing and said indicating means to show the degree of angularity between said sighting instrumentality and said compass indicator.

8. In a surveying instrument: a support having an index mark on an axis thereof; a compass indicator pivotally mounted on said axis of the support with one portion thereof capable of swinging across said axis and adapted to be aligned with said index mark; a device rotatably carried by said support, said device being freely rotatable while making an observation, and including instrumentalities for sighting objects apparently moving in lines across the field of view of the sighting instrumentality, and for simultaneously viewing said compass indicator; a cross-hair within said sighting instrumentality to which may be referred the directional path of objects apparently moving across said field of view; and means responsive to rotation of said support with respect to said device for indicating the angular relationship between said axis and a plane determined by said cross-hair and the line of sight of said sighting instrumentality, whereby: a person may first orient said support so that the index mark on said support coincides with the compass indicator; second, rotate said device with respect to said oriented support until relatively moving objects viewed through said sighting instrumentality appear to move parallel to said cross-hair; and third, determine the angle between said oriented axis and the said plane determined by the cross-hair and line of sight.

LEW SUVERKROP.